United States Patent
Schnug et al.

(10) Patent No.: US 9,937,952 B2
(45) Date of Patent: Apr. 10, 2018

(54) VEHICLES AND VEHICLE SYSTEMS FOR RESTRICTING ROTATION OF A VEHICLE STEERING SYSTEM

(71) Applicant: Toyota Motor Engineering & Manufacturing North America, Inc., Erlanger, KY (US)

(72) Inventors: Tyler E. Schnug, Northville, MI (US); Mark D. Clauser, Saline, MI (US); Gerritt B. Meyers, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 51 days.

(21) Appl. No.: 14/721,265

(22) Filed: May 26, 2015

(65) Prior Publication Data

US 2016/0347360 A1    Dec. 1, 2016

(51) Int. Cl.
*B62D 7/22*    (2006.01)
*B62D 5/04*    (2006.01)
*B62D 1/16*    (2006.01)

(52) U.S. Cl.
CPC ............ *B62D 7/226* (2013.01); *B62D 1/16* (2013.01); *B62D 5/0472* (2013.01); *B62D 7/22* (2013.01)

(58) Field of Classification Search
CPC ........... B62D 7/22; B62D 7/224; B62D 7/226
USPC .............................................. 701/41; 280/90
See application file for complete search history.

(56) References Cited

U.S. PATENT DOCUMENTS

| | | | |
|---|---|---|---|
| 4,130,298 A | | 12/1978 | Shaunnessey |
| 4,352,304 A | * | 10/1982 | Warner ............... F16F 9/12 |
| | | | 188/290 |
| 5,415,019 A | | 5/1995 | Perez |
| 5,542,343 A | * | 8/1996 | Martin ............... B62D 5/083 |
| | | | 137/625.21 |
| 5,927,152 A | | 7/1999 | Marzio et al. |
| 6,018,691 A | * | 1/2000 | Yamamoto ........... B62D 5/0463 |
| | | | 180/404 |
| 6,065,561 A | * | 5/2000 | Howard ............... B62D 1/16 |
| | | | 180/441 |
| 6,120,046 A | * | 9/2000 | Daly ............... B62D 7/224 |
| | | | 267/273 |
| 6,135,224 A | * | 10/2000 | Thomas ............... B62D 1/16 |
| | | | 180/78 |

(Continued)

FOREIGN PATENT DOCUMENTS

| | | | | |
|---|---|---|---|---|
| GB | 1387636 A | * | 3/1975 | ............ B62D 7/224 |
| GB | 1450859 A | * | 9/1976 | ............ B62D 7/224 |

(Continued)

*Primary Examiner* — Ruth Ilan
(74) *Attorney, Agent, or Firm* — Dinsmore & Shohl LLP

(57) ABSTRACT

Vehicles and vehicle systems for restricting rotation of vehicle steering systems are disclosed herein. In one embodiment, a vehicle including a front wheel, a steering column assembly coupled to the front wheel, a steering wheel coupled to the steering column assembly, a steering rack assembly that includes a rack coupled to the front wheel, where the rack extends in a vehicle lateral direction and is translatable with respect to a body of the vehicle in the vehicle lateral direction, and a resistance device including a damper coupled to at least one of the steering rack assembly and the steering column assembly that limits a rotation of the steering column assembly.

11 Claims, 8 Drawing Sheets

(56) References Cited

U.S. PATENT DOCUMENTS

| | | | | |
|---|---|---|---|---|
| 6,491,313 B1* | 12/2002 | Rui | ..................... | F16F 9/466 188/275 |
| 6,508,480 B2* | 1/2003 | Smith, Jr. | ............... | B62D 7/224 180/400 |
| 6,547,043 B2* | 4/2003 | Card | ..................... | F16F 9/535 188/267.2 |
| 6,561,305 B2* | 5/2003 | Smith, Jr. | ............... | B62D 5/062 180/427 |
| 6,619,420 B1* | 9/2003 | Saarinen | ................ | B62D 3/123 180/423 |
| 6,637,558 B2* | 10/2003 | Oliver | ..................... | F16F 9/535 180/400 |
| 6,662,912 B2* | 12/2003 | Smith, Jr. | ............... | F16F 9/535 188/267.1 |
| 6,681,883 B2* | 1/2004 | Loh | ........................ | B62D 5/22 180/417 |
| 6,752,425 B2* | 6/2004 | Loh | ........................ | F16F 9/535 180/417 |
| 6,817,620 B1* | 11/2004 | Howard | ................ | B62D 7/228 280/89.11 |
| 6,952,059 B1 | 10/2005 | Louvel et al. | | |
| 7,316,419 B2* | 1/2008 | Fischer | ................. | B62D 7/224 280/771 |
| 7,322,890 B2* | 1/2008 | Waller | ..................... | B62D 1/16 464/45 |
| 7,380,804 B2* | 6/2008 | Lee | ........................ | B62D 7/224 280/777 |
| 7,455,130 B2 | 11/2008 | Irikura | | |
| 7,523,806 B2* | 4/2009 | Krieger | ................ | B62D 5/0472 180/443 |
| 7,862,056 B2* | 1/2011 | Zeid | ...................... | B62D 7/224 188/380 |
| 8,090,502 B2* | 1/2012 | Brosig | ................. | B62D 5/0472 180/204 |
| 8,267,220 B2* | 9/2012 | Sugiyama | ............ | B62D 5/0463 180/443 |
| 8,281,684 B2* | 10/2012 | Frasch | .................... | B62D 1/16 280/777 |
| 8,511,420 B2 | 8/2013 | Kojo et al. | | |
| 8,556,023 B2* | 10/2013 | Shimizu | ................... | B62D 1/16 180/444 |
| 8,634,989 B1 | 1/2014 | Schramm | | |
| 8,666,604 B2* | 3/2014 | Fehlings | .............. | B62D 5/0481 701/41 |
| 8,682,532 B2* | 3/2014 | Yu | ............................ | B62D 3/12 180/446 |
| 8,696,476 B1* | 4/2014 | Dial, Jr. | .................. | F16D 1/033 464/137 |
| 8,714,042 B2* | 5/2014 | Yu | .......................... | B62D 3/123 74/388 PS |
| 8,783,719 B2* | 7/2014 | Huber | ..................... | B62D 1/185 180/444 |
| 8,925,939 B2* | 1/2015 | Ohashi | ..................... | B62D 3/12 280/93.514 |
| 2002/0142850 A1* | 10/2002 | Garcia | ..................... | B62D 1/16 464/180 |
| 2005/0155813 A1* | 7/2005 | Roll | ......................... | B62D 6/10 180/446 |
| 2006/0237271 A1* | 10/2006 | Athanasiou | ............ | B62D 7/224 188/290 |
| 2009/0266658 A1* | 10/2009 | Lueker, Jr. | ............. | B62D 7/228 188/267.1 |
| 2010/0051377 A1* | 3/2010 | Sugitani | ................. | B62D 7/224 180/443 |
| 2010/0114432 A1* | 5/2010 | Brooks | ................... | B62D 7/224 701/41 |
| 2011/0276228 A1* | 11/2011 | Rothhamel | .............. | B62D 1/00 701/41 |
| 2013/0173115 A1* | 7/2013 | Gunia | ...................... | B62D 6/00 701/41 |
| 2013/0179037 A1* | 7/2013 | Ebihara | ................ | B62D 5/0472 701/41 |
| 2014/0028008 A1 | 1/2014 | Stadler et al. | | |
| 2016/0339955 A1* | 11/2016 | Rodriguez | ............ | B62D 7/226 |

FOREIGN PATENT DOCUMENTS

| | | | |
|---|---|---|---|
| JP | 2006082705 | 3/2006 | |
| WO | WO 2007073653 A1 * | 7/2007 | ......... B60C 23/0408 |

* cited by examiner

VEHICLES AND VEHICLE SYSTEMS FOR RESTRICTING ROTATION OF A VEHICLE STEERING SYSTEM

TECHNICAL FIELD

The present specification generally relates to vehicles and vehicle systems, and more specifically to vehicles and vehicle systems for restricting rotation of vehicle steering systems.

BACKGROUND

Vehicles may be equipped with steering systems that allow an occupant to steer the vehicle. Vehicles may also be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and more particularly to a front wheel of the front suspension unit. As the unabsorbed energy is directed into the front wheel, the energy may cause the front wheel, and subsequently a steering system of the vehicle, to rotate.

Accordingly, a need exists for alternative methods and systems for restricting rotation of a steering system during a small front bumper overlap impact.

SUMMARY

In one embodiment, a vehicle includes a front wheel, a steering column assembly coupled to the front wheel, a steering wheel coupled to the steering column assembly, a steering rack assembly that includes a rack coupled to the front wheel, where the rack extends in a vehicle lateral direction and is translatable with respect to a body of the vehicle in the vehicle lateral direction, and a resistance device including a damper coupled to at least one of the steering rack assembly and the steering column assembly that limits a rotation of the steering column assembly.

In another embodiment, a vehicle system includes a front wheel, a steering column assembly coupled to the front wheel, a steering wheel coupled to the steering column assembly, a steering rack assembly that includes a rack coupled to the front wheel, where the rack extends in a vehicle lateral direction and is translatable with respect to a body of the vehicle in the vehicle lateral direction a sensor configured to provide an output based on a vehicle condition, a resistance device coupled to at least one of the steering column assembly and the steering rack assembly, where the resistance device includes a deactivated configuration and an activated configuration, and an electronic controller that is communicatively coupled to the resistance device and the sensor, the electronic controller including a processor and a memory storing a computer readable and executable instruction set, where, when the computer readable and executable instruction set is executed by the processor, the electronic controller detects a vehicle condition with the sensor, and commands the resistance device to change from the deactivated configuration into the activated configuration based on the detected vehicle condition, where the resistance device applies a force to resist at least one of a rotation of the steering column assembly and a translation of the rack of the steering rack assembly in the activated configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
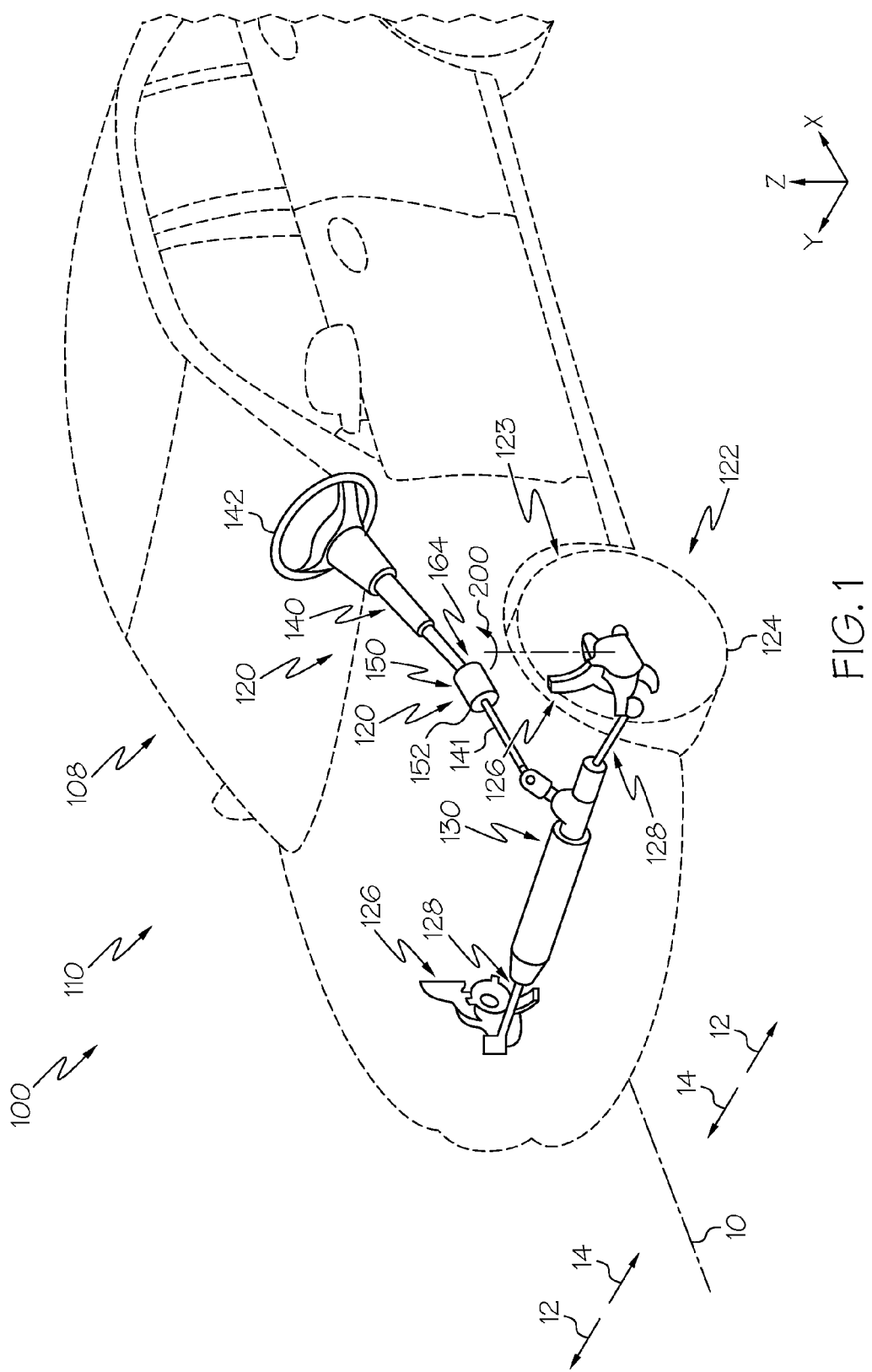
FIG. 1 schematically depicts a perspective view of a vehicle including a steering system including a resistance device according to one or more embodiments shown or described herein.

Vehicles and vehicle systems according to the present specification include a resistance device that inhibits unintended rotation of a steering wheel and/or a front wheel, particularly during a small front bumper overlap impact. In some embodiments, the resistance device may include a damper that is coupled to at least one of a steering rack assembly and a steering column assembly. In other embodiments, the resistance device may be changed between a deactivated configuration and an activated configuration, where the resistance device applies a force to resist at least one of a rotation of a steering column assembly and a translation of a steering rack assembly in the activated configuration. In some embodiments, the resistance device is changed into the activated configuration based on a detected deceleration of a body of the vehicle. In other embodiments, the resistance device is repositioned into the activated configuration based on a detected rotational speed of at least one or both of a steering column assembly and a steering wheel. These and other embodiments will be described in more detail below in reference to the appended drawings.

As used herein, the term "vehicle longitudinal direction" refers to the forward-rearward direction of the vehicle (i.e., in the +/−vehicle X-direction depicted in FIGS. 1-6). The term "vehicle lateral direction" refers to the cross-vehicle direction (i.e., in the +/−vehicle Y-direction depicted in FIGS. 1-6), and is transverse to the vehicle longitudinal direction. The term "vehicle vertical direction" refers to the upward-downward direction of the vehicle (i.e., in the +/−vehicle Z-direction depicted in FIGS. 1-6). Further, the terms "inboard" and "outboard" are used to describe the relative positioning of various components of the vehicle. Referring to FIGS. 1-6, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

The phrase "communicatively coupled" is used herein to describe the interconnectivity of various components of steering system and means that the components are connected either through wires, optical fibers, or wirelessly such that electrical, optical, and/or electromagnetic signals may be exchanged between the components.

Motor vehicles that incorporate elements according to the present disclosure may include a variety of construction methodologies that are conventionally known, including the unibody construction methodology depicted in FIGS. 1-6 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100.

The vehicle 100 includes a steering system 120. The steering system 120 generally includes a front wheel 124, a steering rack assembly 130, and a steering column assembly 140. The steering system 120 may include a pair of front suspension units 122 that are coupled to the body 110. The front suspension units 122 may generally include vehicle components that connect the body 110 of the vehicle 100 to the front wheel 124. These components may include a front chassis member that includes a spring and a strut. The spring and the strut may be coupled to a steering knuckle assembly 126 that includes a hub. The front wheel 124 may be coupled to the hub of the steering knuckle assembly 126, thereby coupling the front wheel 124 to the steering knuckle assembly 126.

The steering knuckle assembly 126 may be coupled to a tie rod 128 that is positioned inboard of the front wheel 124. The tie rod 128 is also coupled to the steering rack assembly 130. Accordingly, the front wheel 124 is coupled to the steering rack assembly 130 through the steering knuckle assembly 126 and the tie rod 128. The steering rack assembly 130 extends in the vehicle lateral direction and is configured to manipulate an orientation of the front wheel 124 with respect to the body 110, as will be described in greater detail herein.

The steering column assembly 140 is coupled to the steering rack assembly 130. The steering column assembly 140 includes a steering column 141 that extends rearward and upward of the steering rack assembly 130 in the vehicle longitudinal direction. The steering column assembly 140 may also include a steering wheel 142 that is coupled to the steering column 141 and that is positioned within the cabin 108 of the vehicle 100. Accordingly, the steering wheel 142 is coupled to the front wheel 124, the steering rack assembly 130, the tie rod 128, and the steering knuckle assembly 126. By rotating the steering wheel 142, an occupant of the vehicle 100 may manipulate the orientation of the front wheel 124 with respect to the body 110 of the vehicle 100. Specifically, when the steering wheel 142 is rotated, the front wheel 124 may rotate about an axis 200 with respect to the body 110 of the vehicle 100. By rotating the front wheel 124 about the axis 200 with respect to the body 110 of the vehicle 100, an occupant may steer the vehicle 100 during normal vehicle operation.

Similarly, when the front wheel 124 is rotated about the axis 200 with respect to the body 110, for example when an external force is applied to the front wheel 124, the steering wheel 142 may be rotated. An external force may be applied to the front wheel 124 during a variety of driving or testing conditions, including driving the vehicle 100 over an uneven driving surface, or an impact to the vehicle 100, such as a small front bumper overlap impact, as will be described in greater detail herein.

The steering system 120 includes a resistance device 150 that is coupled to the steering column assembly 140 such that the resistance device 150 is engaged with and/or is engageable with the steering column assembly 140. In some embodiments, such as the embodiment shown in FIG. 1, the resistance device 150 is coupled to the steering column 141 of the steering column assembly 140. In other embodiments, the resistance device 150 may be coupled to the steering wheel 142 of the steering column assembly 140. Alternatively, the resistance device 150 may be coupled to both the steering wheel 142 and the steering column 141 of the steering column assembly 140. The resistance device 150 may include a motor 152 that is coupled to the steering column assembly 140. In some embodiments, such as in vehicles that include an electronically assisted power steering system, the motor 152 may provide increased torque to the steering rack assembly 130 as compared to a torque applied to the steering wheel 142 by an occupant, thus reducing the amount of torque required for an occupant to steer the vehicle. In other embodiments, the motor 152 may be a standalone or separate motor that is not utilized as part of an electronically assisted power steering system.

During ordinary vehicle operation, the resistance device 150 is in a deactivated configuration. In the deactivated configuration, the motor 152 may allow the steering column assembly 140 to rotate freely. In embodiments where the motor 152 is included as a component of an electronically assisted power steering system, the motor 152 may provide electronically assisted power by providing an increased torque to the steering rack assembly 130 in response to a torque applied to the steering wheel 142 by an occupant while the resistance device 150 is in the deactivated configuration.

The resistance device 150 may be changed from the deactivated configuration to an activated configuration. In the activated configuration, the motor 152 is engaged with the steering column assembly 140 such that the motor 152 may apply a force to the steering column assembly 140 against a direction of rotation of the steering column assembly 140. As described hereinabove, when the front wheel 124 is rotated with respect to the body 110, such as when an external force is applied to the front wheel 124, the steering rack assembly 130 may translate, subsequently rotating the steering column assembly 140 and the steering wheel 142. In the activated configuration, the motor 152 may apply a force to the steering column assembly 140 to resist this rotation of the steering column assembly 140. By applying a force to resist rotation of the steering column assembly 140, when the resistance device 150 is in the activated configuration, the resistance device 150 may limit (e.g., restrict and/or prevent) rotation of the front wheel 124 and the steering wheel 142 during an impact to the vehicle 100.

Figure 2:
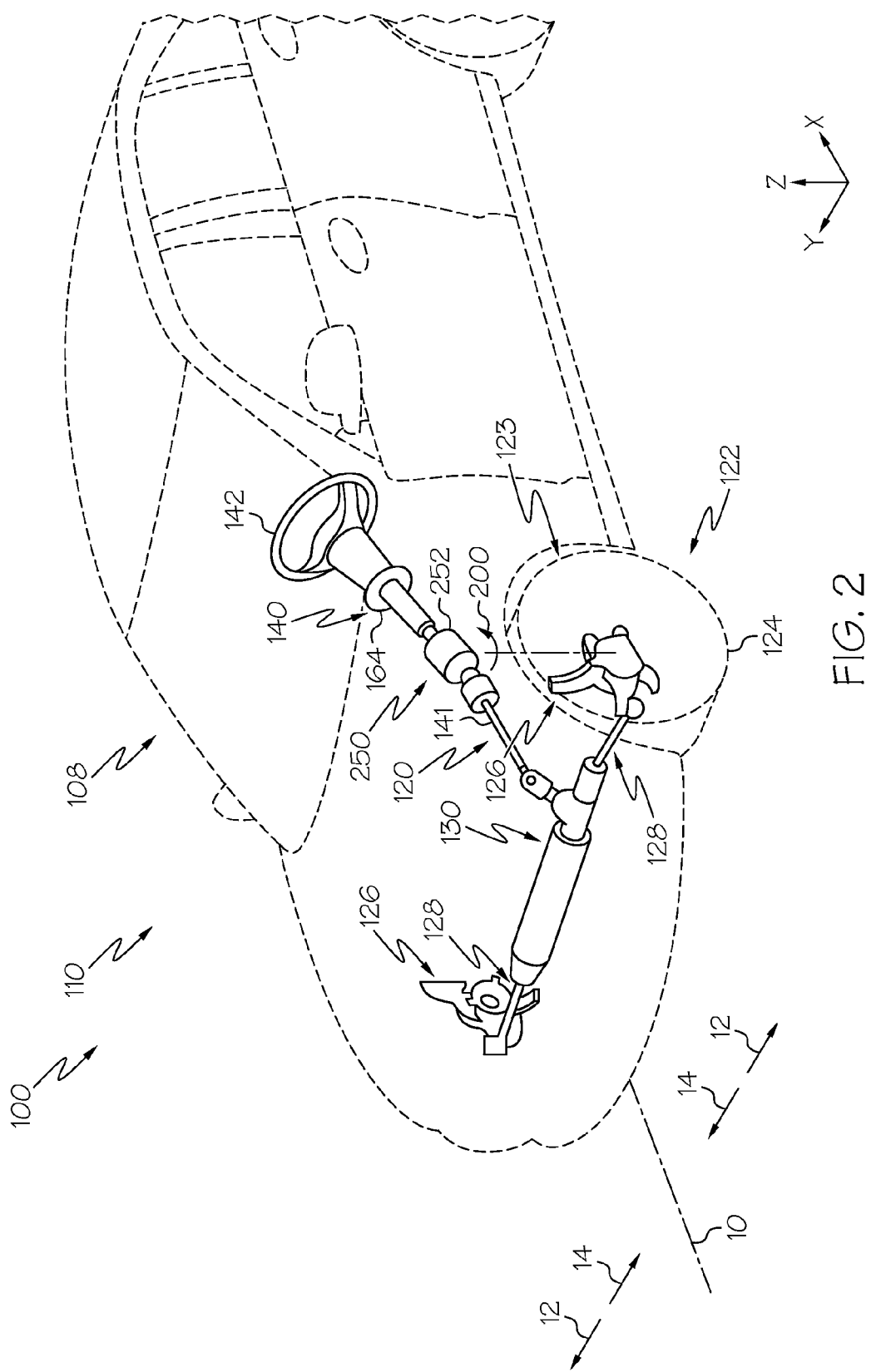
FIG. 2 schematically depicts a perspective view of a vehicle including a steering system including another embodiment of a resistance device according to one or more embodiments shown or described herein.

Referring now to FIG. 2, the vehicle 100 is depicted including another embodiment of a resistance device 250. As described hereinabove, the steering system 120 includes a front wheel 124 coupled to the steering rack assembly 130, a steering column assembly 140 coupled to the steering rack assembly 130, the steering column assembly 140 including the steering wheel 142. The resistance device 250 is coupled to the steering column assembly 140. In this embodiment, the resistance device 250 may include a damper 252 coupled to the steering column assembly 140 such that the damper 252 is engaged with and/or is engagable with the steering column assembly 140. The resistance device 250 may be coupled to the steering column 141 of the steering column assembly 140, as depicted in FIG. 2. Alternatively, the resistance device 250 may be coupled to the steering wheel 142 of the steering column assembly 140. In still other embodiments, the resistance device 250 may be coupled to both the steering column 141 and the steering wheel 142 of the steering column assembly 140.

In some embodiments, the damper 252 includes a passive damper that provides a resistance force to rotation of the steering column assembly 140 that is proportional to a rotational speed of the steering column assembly 140. The passive damper may include a variety of dampers, including, but not limited to, viscous dampers and the like. The passive damper of the damper 252 may provide a first resistance to rotation of the steering column assembly 140 when the steering column assembly 140 rotates at first rotational speed. The passive damper of the damper 252 may provide a second resistance to rotation of the steering column assembly 140 when the steering column assembly 140 rotates at second rotational speed. The first resistance may be greater than the second resistance and the first rotational speed may be higher than the second rotational speed. By resisting rotation of the steering column assembly 140 at relatively high rotational speeds, the resistance device 250 may limit rotation of the front wheel 124 and the steering wheel 142 during an impact to the vehicle 100.

In some embodiments, the damper 252 of the resistance device 250 may include an active damper that includes a deactivated configuration and an activated configuration. When the damper 252 includes an active damper, the damper 252 may include a variety of dampers, including, but not limited to a hydraulically activated damper, an electro-hydraulically activated damper, an electromagnetic recuperative damper, a valve-actuated damper, a magneto-rheological damper, or the like. When the damper 252 is changed to the activated configuration, the damper 252 may provide a first resistance to rotation of the steering column assembly 140. During ordinary vehicle operation, the damper 252 is in the deactivated configuration. In the deactivated configuration, the damper 252 may provide a second resistance to rotation of the steering column assembly 140. The first resistance may be greater than the second resistance. By resisting rotation of the steering column assembly 140, the resistance device 250 may limit rotation of the front wheel 124 and the steering wheel 142 during an impact.

Still referring to FIG. 2, the vehicle 100 may include a rotational sensor 164 may also be coupled to the steering column 141 of the steering column assembly 140. In some embodiments, the rotational sensor 164 may also or may alternatively be coupled to the steering wheel 142 of the steering column assembly. The rotational sensor 164 may be configured to detect a rotational speed of the steering column 141 and/or the steering wheel 142. The rotational sensor 164 may include various rotational detection devices coupled to the steering column 141 and/or the steering wheel 142, including, but not limited to, an encoder wheel, a magnetic wheel, or the like. In embodiments that include the motor 152, such as the embodiment shown in FIG. 1, the rotational sensor 164 may be integral with the motor 152. In other embodiments, the rotational sensor 164 may include a separate sensor coupled to a steering column 141 of the steering column assembly 140. In some other embodiments, the rotational sensor 164 may include sensors that detect a rotation speed of a pinion gear 144 (FIG. 3) of the steering column assembly 140. In such embodiments, the rotational sensor 164 may include a various sensors configured to detect rotation of the pinion gear 144, for example, through detection of movement and/or presence of a plurality of teeth 146 of the pinion gear 144, including, but not limited to proximity sensors and the like.

Figure 3:
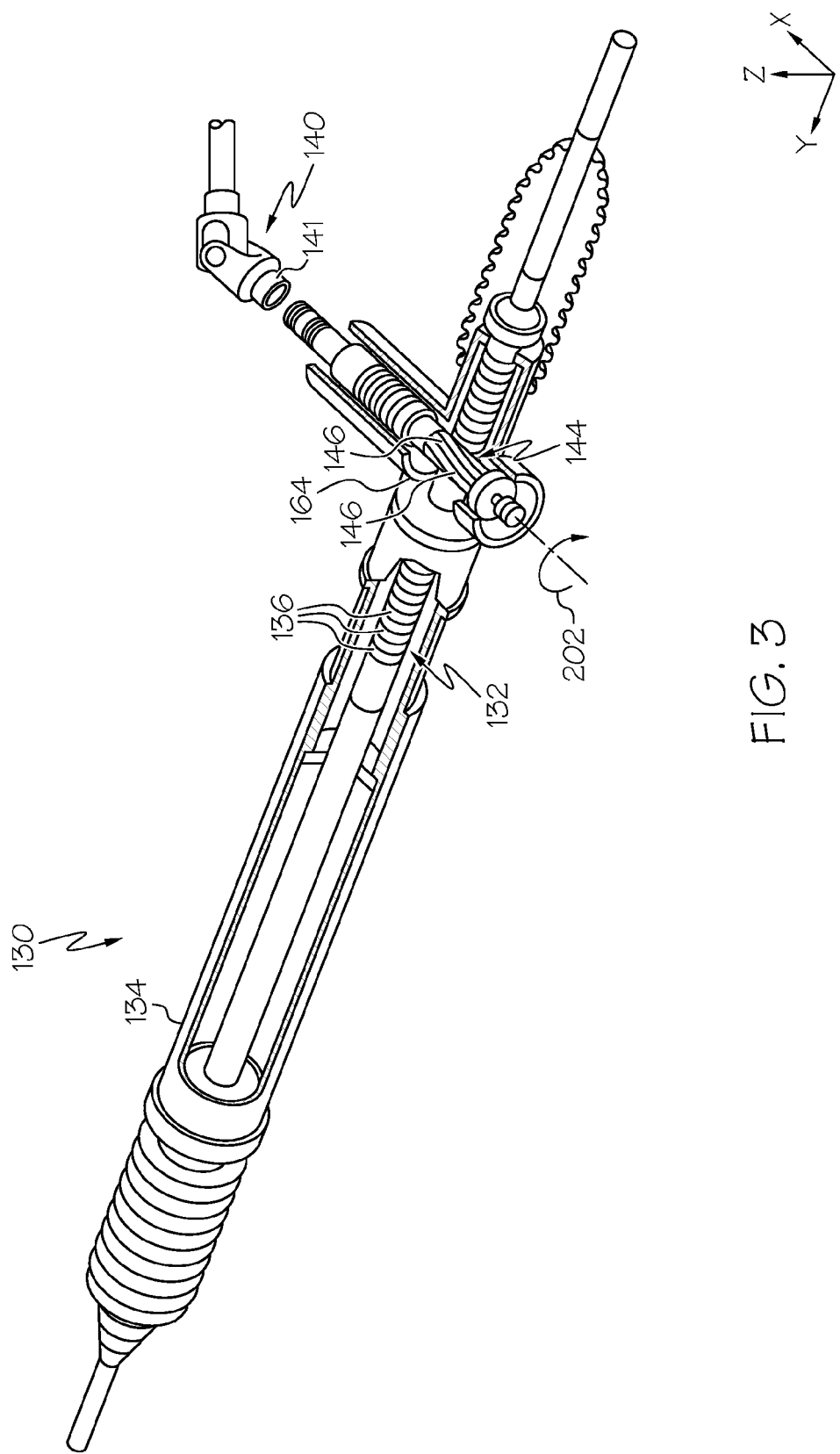
FIG. 3 schematically depicts an enlarged perspective view of a steering rack assembly and a steering column assembly of a steering system according to one or more embodiments shown or described herein.

Referring to FIG. 3, the steering rack assembly 130 is depicted with certain portions removed for clarity. The steering rack assembly 130 includes a rack 132 that is positioned within a housing 134. The housing 134 may be coupled to the body 110 of the vehicle 100 such that a position of the housing 134 of the steering rack assembly 130 is generally fixed with respect to the body 110 during normal vehicle operation. The rack 132 is positioned at least partially within the housing 134. The rack 132 is configured to translate in the vehicle lateral direction with respect to the housing 134. Because the housing 134 is coupled to the body 110, the rack 132 is configured to translate in the vehicle lateral direction with respect to the body 110.

The steering column assembly 140 may include the pinion gear 144 that is coupled to the steering column 141, such that when the steering column 141 is rotated, the pinion gear 144 rotates about axis 202. The pinion gear 144 includes the plurality of teeth 146 that may engage a plurality of teeth 136 on the rack 132. As the pinion gear 144 rotates about axis 202, the engagement between the plurality of teeth 146 of the pinion gear 144 and the plurality of teeth 136 of the rack 132 causes the rack 132 to translate in the vehicle lateral direction. Similarly, when the rack 132 is translated, such as when an external force is applied to the rack 132, the engagement between the plurality of teeth 146 of the pinion gear 144 and the plurality of teeth 136 of the rack 132 may cause the pinion gear 144 to rotate.

Figure 4:
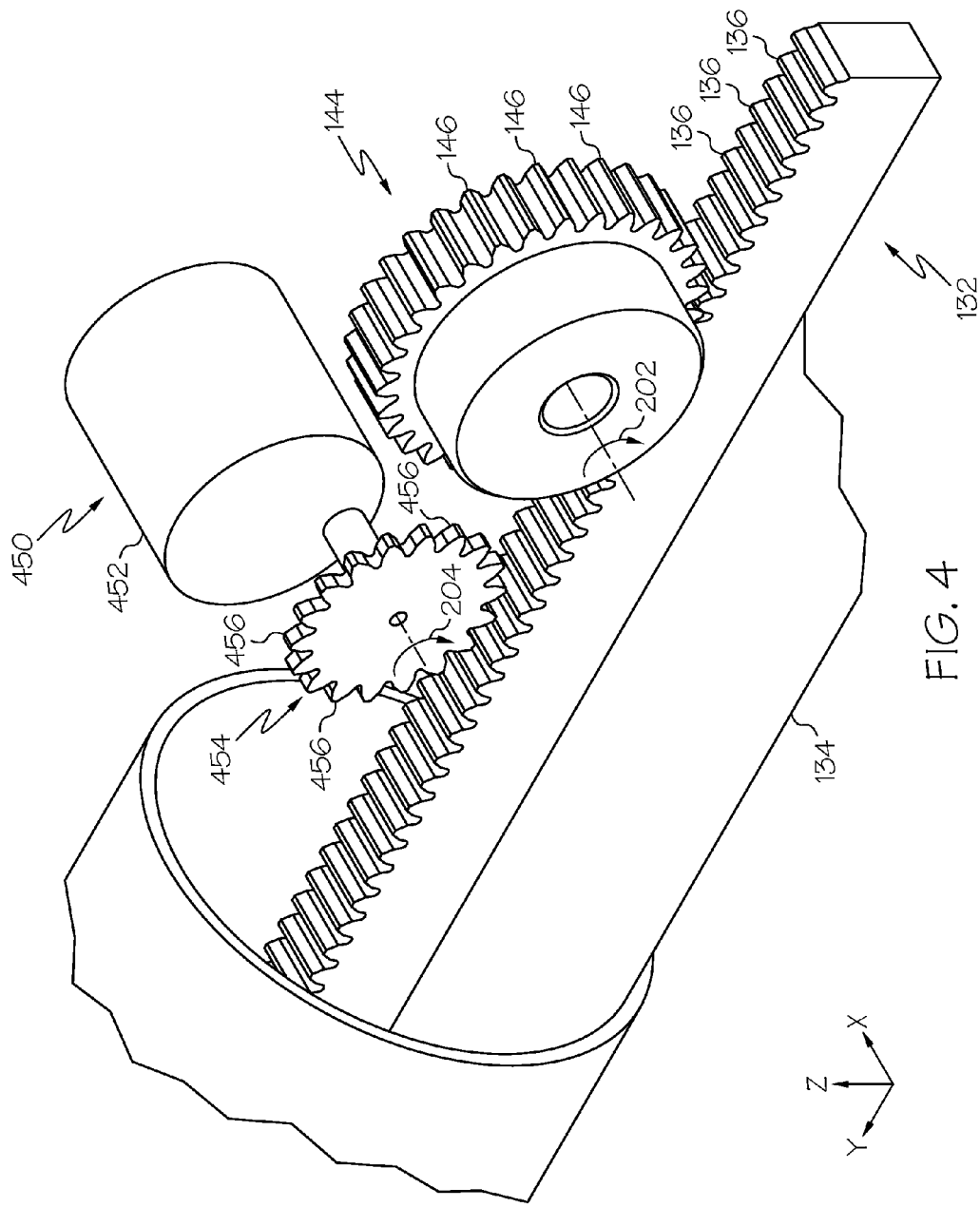
FIG. 4 schematically depicts an enlarged perspective view of a rack and a resistance device for use in the steering rack assembly according to one or more embodiments shown or described herein.

Referring to FIG. 4, the rack 132 and the pinion gear 144 are shown in isolation with another embodiment of a resistance device 450. As described hereinabove, the plurality of teeth 146 of the pinion gear 144 are engaged with the plurality of teeth 136 of the rack 132. In some embodiments, such as the embodiment depicted in FIG. 4, the plurality of teeth 146 of the pinion gear 144 may be straight-cut gear teeth (i.e., are aligned in an axial direction of the pinion gear 144). In other embodiments, such as the embodiment depicted in FIG. 3, the plurality of teeth 146 of the pinion gear 144 may be helically cut gear teeth. It should be understood that the plurality of teeth 146 may include any suitable shape that is engagable with the plurality of teeth 136 of the rack 132.

The resistance device 450 may be coupled to the body 110 either directly or indirectly. In some embodiments, such as the embodiment depicted in FIG. 4, the resistance device 450 may be coupled to the housing 134 which is coupled to the body 110, thereby coupling the resistance device 450 to the body 110. The resistance device 450 may be coupled to the body 110 such that a position of the resistance device 450 is generally fixed with respect to the body 110.

The resistance device 450 may include a motor 452 that is coupled to a pinion 454. The pinion 454 may include a plurality of teeth 456 that are engaged with the plurality of teeth 136 of the rack 132. The motor 452 may be configured to drive the pinion 454 such that the pinion 454 rotates about axis 204. Because the plurality of teeth 456 of the pinion 454 are engaged with the plurality of teeth 136 of the rack 132, when the motor 452 drives the pinion 454, the motor 452 may apply a force acting on the rack 132 in the vehicle lateral direction.

During ordinary vehicle operation, the resistance device 450 is in a deactivated configuration. In the deactivated configuration, the motor 452 may allow the pinion 454 to rotate freely about the axis 204. Because the pinion 454 may freely rotate about the axis 204, the resistance device 450 may allow the rack 132 to translate freely in the vehicle lateral direction.

The resistance device 450 may be changed between the deactivated configuration and an activated configuration. In the activated configuration, the motor 452 may be engaged and may drive the pinion 454 to rotate about the axis 204. Because the plurality of teeth 456 of the pinion 454 are engaged with the plurality of teeth 136 of the rack, when the motor 452 drives the pinion 454 to rotate, the resistance device 450 applies a force to the rack 132 in the vehicle lateral direction. The resistance device 450 may be configured to apply a force to the rack 132 against a direction of translation of the rack 132 in the vehicle lateral direction.

As described hereinabove, when the front wheel 124 is rotated with respect to the body 110, such as when an external force is applied to the front wheel 124, the steering rack assembly 130 may translate, subsequently rotating the steering column assembly 140 and the steering wheel 142. By applying a force to the rack 132 against a direction of translation of the rack 132 in the vehicle lateral direction, the resistance device 450 limit (e.g., restrict and/or prevent) rotation of the front wheel 124 and the steering wheel 142.

Figure 5:
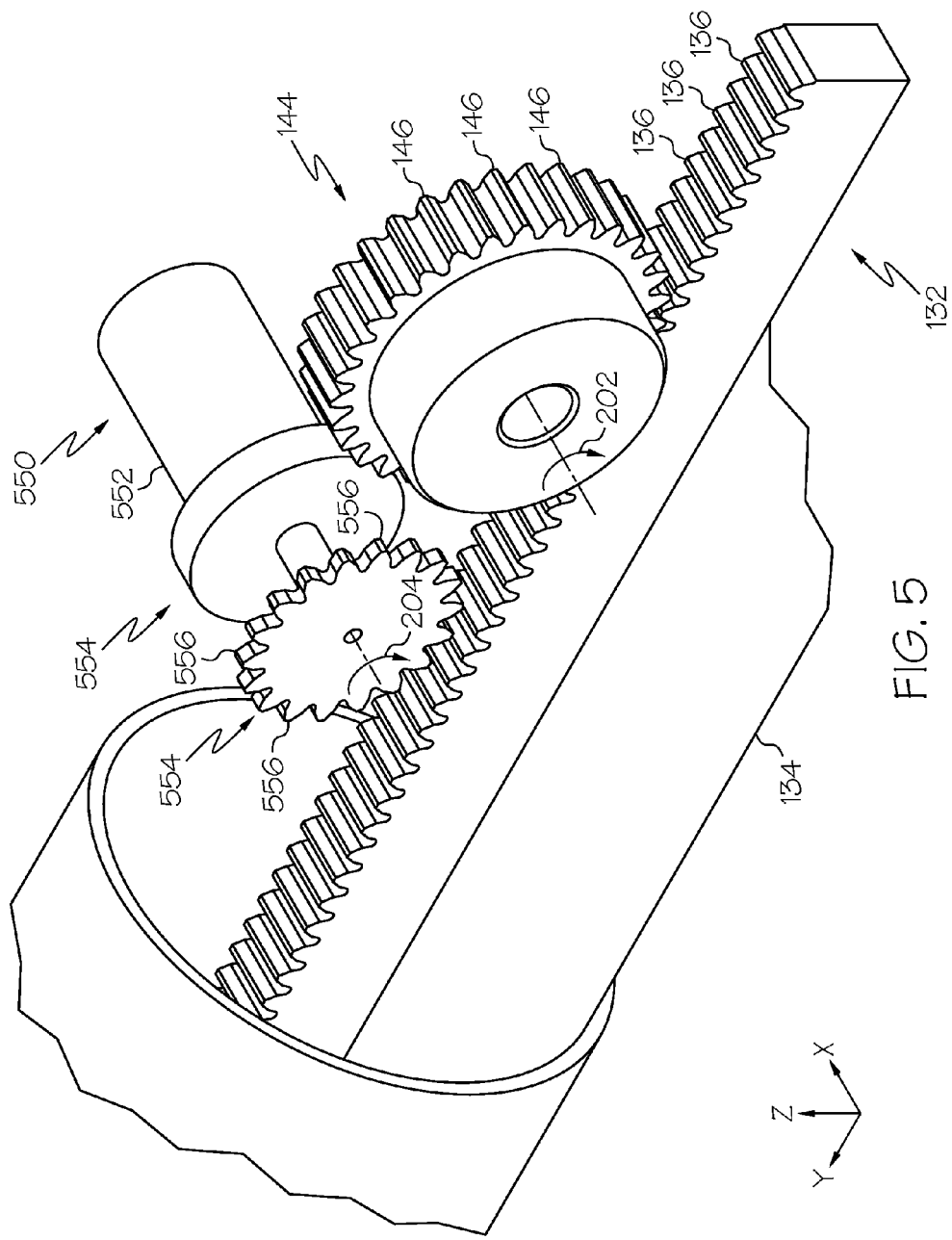
FIG. 5 schematically depicts an enlarged perspective view of a rack and another embodiment of a resistance device for use in the steering rack assembly according to one or more embodiments shown or described herein.

Referring now to FIG. 5, the rack 132 and the pinion gear 144 are shown in isolation with another embodiment of a resistance device 550. The resistance device 550 of the steering system 120 may be coupled to the body 110 either directly or indirectly. In some embodiments, such as the embodiment depicted in FIG. 5, the resistance device 550 may be coupled to the housing 134 which is coupled to the body 110, thereby coupling the resistance device 550 to the body 110. The resistance device 550 may be coupled to the body 110 such that a position of the resistance device 550 is generally fixed with respect to the body 110.

The resistance device 550 may include a rotary damper 552 that is coupled to a pinion 554. The pinion 554 may include a plurality of teeth 556 that engage the plurality of teeth 136 of the rack 132. Because the plurality of teeth 556 of the resistance device 550 are engaged with the plurality of teeth 136 of the rack 132, when the rack 132 translates in the vehicle lateral direction, the rack causes the pinion 554 to rotate about the axis 204.

In some embodiments, the rotary damper 552 include a passive damper that provides a resistance force to rotation of the pinion 554 that is proportional to a rotational speed of the pinion 554. The passive damper may include a variety of dampers, including, but not limited to viscous dampers and the like. The passive damper of the rotary damper 552 may provide a first resistance to rotation of the pinion 554 about the axis 204 when the pinion 554 rotates at a first rotational speed. The passive damper of the rotary damper 552 may provide a second resistance to rotation of the pinion 554 when the pinion 554 rotates at a second rotational speed. The first resistance may be greater than the second resistance and the first rotational speed may be higher than the second rotational speed. Because the plurality of teeth 556 of the pinion 554 engage the plurality of teeth 136 of the rack 132, the passive damper of the rotary damper 552 may provide relatively high resistance to translation of the rack 132 in the vehicle lateral direction at relatively high translation speeds. Likewise, the passive damper of the rotary damper 552 may provide relatively low resistance to translation of the rack 132 in the vehicle lateral direction at relatively low translation speeds. By resisting translation of the rack 132 in the vehicle lateral direction at relatively high translation speeds, the resistance device 550 may resist rotation of the front wheel 124 and the steering wheel 142 during an impact.

In some embodiments, the rotary damper 552 of the resistance device 550 may include an active damper that includes a deactivated configuration and an activated configuration. When the rotary damper 552 includes an active damper, the rotary damper 552 may include a variety of dampers, including, but not limited to a hydraulically activated damper, electro-hydraulically activated damper, an electromagnetic recuperative damper, a valve-actuated damper, a magneto-rheological damper, or the like. When the rotary damper 552 is changed to the activated configuration, the rotary damper 552 may provide a first resistance to rotation of the pinion 554 about the axis 204. During ordinary vehicle operation, the rotary damper 552 is in the deactivated configuration. In the deactivated configuration, the rotary damper 552 may provide a relatively low resistance to rotation of the pinion 554 about the axis 204. The first resistance may be greater than the second resistance. Because the plurality of teeth 556 of the pinion 554 are engaged with the plurality of teeth 136 of the rack 132, the rotary damper 552 may provide relatively low resistance to translation of the rack 132 in the vehicle lateral direction in the deactivated configuration. Likewise, the rotary damper 552 may provide relatively high resistance to translation of the rack 132 in the vehicle lateral direction in the activated configuration. By resisting translation of the rack 132 in the vehicle lateral direction, the resistance device 550 may resist rotation of the front wheel 124 and the steering wheel 142 during an impact.

Figure 6:
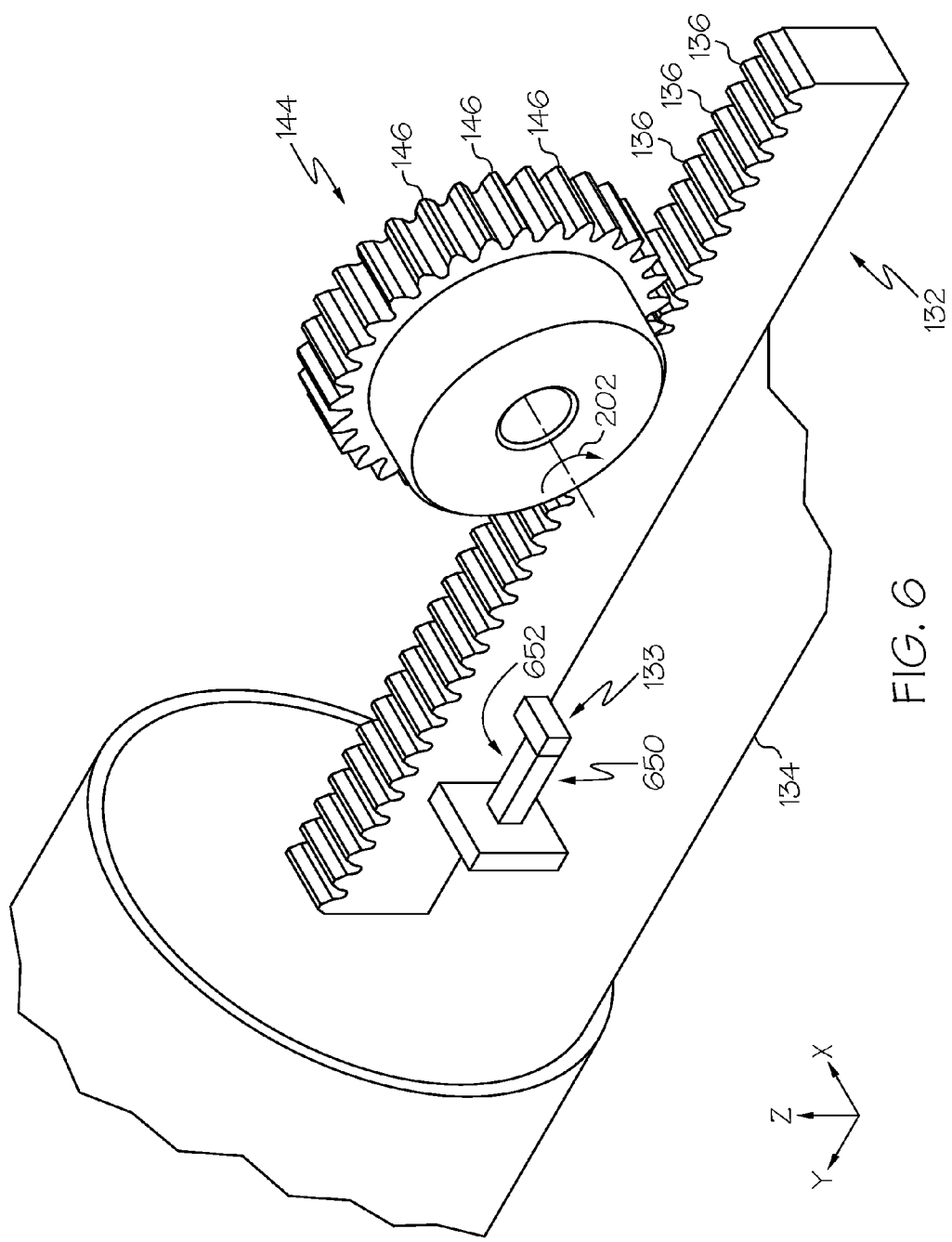
FIG. 6 schematically depicts an enlarged perspective view of a rack and another embodiment of a resistance device for use in the steering rack assembly according to one or more embodiments shown or described herein.

Referring now to FIG. 6, the rack 132 and the pinion gear 144 are shown in isolation with another embodiment of a resistance device 650. The resistance device 650 of the steering system 120 may be coupled to the body 110 either directly or indirectly. In some embodiments, such as the embodiment depicted in FIG. 6, the resistance device 650 may be coupled to the housing 134 which is coupled to the body 110, thereby coupling the resistance device 650 to the body 110. The resistance device 650 may be coupled to the body 110 such that a position of the resistance device 650 is generally fixed with respect to the body 110.

The resistance device 650 includes a linear damper 652 that extends in the vehicle lateral direction. One end of the linear damper 652 is coupled to and contacts the housing 134 and the opposite end of the linear damper 652 is coupled to and contacts a feature 133 that extends outward from the rack 132. Because the linear damper 652 contacts the feature 133 of the rack 132 and the housing 134, the linear damper 652 may provide resistance to translation of the rack 132 in the vehicle lateral direction.

In some embodiments, the linear damper 652 may include a passive damper that provides a resistance force to translation of the rack 132 in the vehicle lateral direction that is proportional to a translation speed of the rack 132 in the vehicle lateral direction. The passive damper may include a variety of dampers, including, but not limited to viscous dampers and the like. The passive damper of the linear damper 652 may provide a first resistance to translation of the rack 132 when the rack 132 translates at a first translation speed. Conversely the passive damper of the linear damper 652 may provide a second resistance to translation of the rack 132 when the rack 132 translates at a second translation speed. The first resistance may be greater than the second resistance and the first translation speed may be greater than the second translation speed. By resisting translation of the rack 132 in the vehicle lateral direction at relatively high translation speeds, the resistance device 650 may resist rotation of the front wheel 124 and the steering wheel 142 during an impact, as will be described in greater detail herein.

In some embodiments, the linear damper 652 of the resistance device 650 may include an active damper that is repositionable between a deactivated configuration and an activated configuration. When the linear damper 652 includes an active and/or semi-active damper, the linear damper 652 may include a variety of dampers, including, but not limited to a hydraulically activated damper, electro-hydraulically activated damper, an electromagnetic recuperative damper, a valve-actuated damper, a magneto-rheological damper, or the like. When the linear damper 652 is changed to the activated configuration, the linear damper 652 may provide a first resistance to translation of the rack 132 in the vehicle lateral direction. During ordinary vehicle operation, the linear damper 652 is in the deactivated configuration. In the deactivated configuration, the linear damper 652 may provide a second resistance to translation of the rack 132 in the vehicle lateral direction. The first resistance may be greater than the second resistance. By resisting translation of the rack 132 in the vehicle lateral direction, the resistance device 650 may resist rotation of the front wheel 124 and the steering wheel 142 during an impact.

Figure 7:
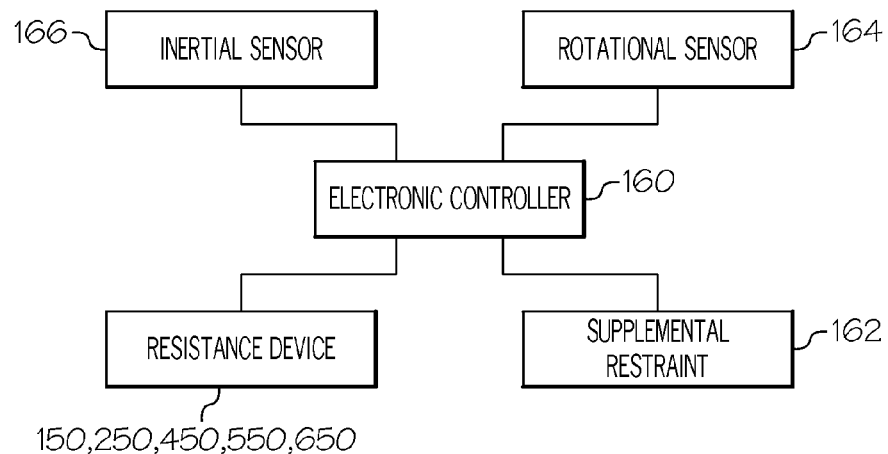
FIG. 7 schematically depicts a block diagram of a vehicle system including a resistance device according to one or more embodiments shown or described herein.

Referring now to FIG. 7, any of the exemplary resistance devices 150, 250, 450, 550, 640 may be communicatively coupled to an electronic controller 160. The electronic controller 160 includes a processor and a memory storing computer readable and executable instructions, which, when executed by the processor, facilitate operation of the resistance device 150, 250, 450, 550, 650. In particular, the electronic controller may send a signal to the resistance device 150, 250, 450, 550, 650 to command the resistance device 150, 250, 450, 550, 650 to change from the deactivated configuration into the activated configuration. In some embodiments, the electronic controller 160 may be a stand-alone controller. In some other embodiments, the electronic controller 160 may be an engine control unit, which is communicatively coupled to an internal combustion engine, such as when the vehicle 100 includes an internal combustion engine. In embodiments where the electronic control unit 116 is an engine control unit, the electronic controller 160 may be responsible for controlling functions of the internal combustion engine, such as fuel flow rate and ignition timing. In still other embodiments, the electronic controller 160 may be a motor control unit communicatively coupled to an electric motor, such as when the vehicle 100 includes an electric motor (i.e., when the vehicle 100 is an electric vehicle or a hybrid vehicle). In embodiments where the electronic controller 160 is a motor control unit, the electronic controller 160 may be responsible for controlling the electric motor, such as regulating the power supplied to the motor, regenerative breaking, and the like.

The vehicle 100 may also include a supplemental restraint system 162 that is communicatively coupled to the electronic controller 160. When the electronic controller 160 executes the computer readable and executable instructions, the electronic controller 160 may facilitate operation of the supplemental restraint system 162. In particular, the electronic controller 160 may send a signal to the supplemental restraint system 162 to command the supplemental restraint system 162 to change from a deactivated configuration into an activated configuration. The supplemental restraint system 162 may include various restraint devices, including, but not limited to an airbag restraint system. In embodiments that include an airbag restraint system, when the supplemental restraint system 162 is in the deactivated configuration, the airbag restraint system may be positioned within panels and components within the cabin 108 of the vehicle 100. In such embodiments, when the supplemental restraint system 162 is changed into the activated configuration, the airbags of the airbag restraint system may be inflated.

The vehicle 100 may include a sensor or variety of sensors. The sensor or sensors are communicatively coupled to an electronic controller 160. The sensor or sensors are configured to detect a vehicle condition, such as the rotation of the steering column assembly 140 and/or the deceleration of the body 110 of the vehicle 100, and provide an output to the electronic controller that is indicative of a detected vehicle condition.

In some embodiments, the sensor may include the rotational sensor 164. The rotational sensor 164 is communicatively coupled to the electronic controller 160. The rotational sensor 164 may be coupled to the steering column assembly 140, such that the rotational sensor 164 may detect a rotational speed of the steering column 141 and/or the steering wheel 142. The rotational sensor 164 may send signals to the electronic controller 160 that indicate a detected rotational speed of the steering column assembly 140 and/or the steering wheel 142.

In some embodiments, the sensor may include an inertial sensor 166. The inertial sensor 166 is communicatively coupled to the electronic controller 160. The inertial sensor 166 may be coupled to the body 110 of the vehicle 100. The inertial sensor 166 may be configured to detect an acceleration and deceleration of the inertial sensor 166. Because the inertial sensor 166 is coupled to the body 110 of the vehicle 100, the inertial sensor 166 may detect an acceleration and deceleration of the body 110 of the vehicle 100. The inertial sensor 166 may send signals to the electronic controller 160 that indicate a detected acceleration and deceleration of the body 110 of the vehicle 100.

When a barrier impacts a vehicle, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

In some impact configurations, an object may impact the front corner of the vehicle in what is referred to herein as a small front bumper overlap or a small overlap impact. In a small front bumper overlap impact, the impact occurs at an outboard portion of the vehicle (evaluated in a vehicle lateral direction), and only a portion of the front bumper impacts the object. In some small front bumper overlap impacts, only about 25% of the front bumper impacts the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the body 110 (FIG. 1) for example, may be non-symmetrically loaded when the vehicle is involved in a small overlap impact.

Referring to FIG. 1, when a barrier impacts a front corner of the vehicle 100 in a small front bumper overlap impact, energy associated with the impact may be directed into the front suspension unit 122 that is positioned proximate to the barrier. As the energy associated with the impact is directed into the front suspension unit 122, the energy may cause the front wheel 124 to rotate about axis 200 with respect to the body 110 of the vehicle 100. In some impact configurations, such as a small front bumper overlap impact, energy associated with the impact may cause the front suspension unit 122 to rotate about the axis 200 in a counterclockwise direction as depicted in FIG. 1 such that a rear portion 123 of the front wheel 124 rotates inboard in the vehicle lateral direction.

Energy associated with the collision may also cause the front suspension unit 122 to plastically and elastically deform and translate generally rearward in the vehicle longitudinal direction. As the front suspension unit 122 translates rearward in the vehicle longitudinal direction, the front suspension unit 122 and the front wheel 124 may contact the cabin 108 of the vehicle 100. When the front suspension unit 122 rotates in the counterclockwise direction about the axis 200 and the rear portion 123 of the front wheel 124 rotates inboard, the front wheel 124 may transmit more energy to the cabin 108 of the vehicle 100 as compared to when the front wheel 124 is maintained near a longitudinal orientation as depicted in FIG. 1.

As described hereinabove, when the front wheel 124 is rotated about the axis 200, the tie rod 128 and the rack 132 of the steering rack assembly 130 may translate in the vehicle lateral direction. As the rack 132 translates in the vehicle lateral direction, because the rack 132 is coupled to the steering column assembly 140, the steering column 141 may rotate, causing the steering wheel 142 to rotate. Accordingly, energy associated with the impact may cause the steering wheel 142 to rotate through the connections between the steering wheel 142 and the front wheel 124. In some impact configurations, such as a small front bumper overlap impact, the energy associated with the impact may cause the steering wheel 142 to rotate at a relatively high rotational speed. When the steering wheel 142 rotates at a relatively high rotational speed, the rotation of the steering wheel 142 may decrease the efficiency of supplemental restraints positioned within the steering wheel 142 as compared to when the steering wheel 142 does not rotate or does not rotate at a relatively high rotational speed.

Figure 8:
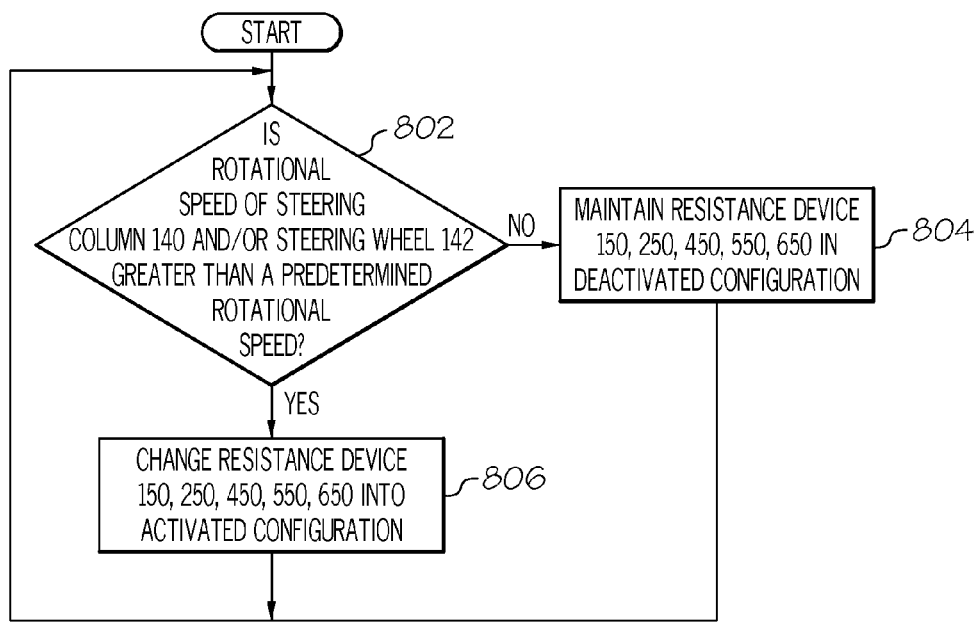
FIG. 8 schematically depicts a logic flowchart of a method of operating a vehicle system including a resistance device according to one or more embodiments shown or described herein.

Turning now to FIG. 8, one embodiment of a method for operating the steering system 120 is depicted in the flow chart of FIG. 8. The resistance device 150, 250, 450, 550, 650 is selectively placed in the deactivated configuration and the activated configuration according to the flow chart depicted in FIG. 8. In a first step 802, the electronic controller 160 receives a signal from the rotational sensor 164 indicating a rotational speed of the steering column 141 of the steering column assembly 140 and/or steering wheel 142 of the steering column assembly 140 and compares this detected rotational speed to a predetermined rotational speed. If the signal received by the electronic controller 160 indicates a rotational speed that is not greater than the predetermined rotational speed, then the electronic controller 160 proceeds to step 804, where the electronic controller 160 commands the resistance device 150, 250, 450, 550, 650 to remain in the deactivated configuration. If the signal received by the electronic controller 160 indicates a rotational speed that is greater than the predetermined rotational speed, then the electronic controller 160 proceeds to step 806. At step 806, the electronic controller 160 commands the resistance device 150, 250, 450, 550, 650 to change from the deactivated configuration into the activated configuration.

It should be understood that the electronic controller 160 may not necessarily send a signal to command the resistance device 150, 250, 450, 550, 650 to remain in the deactivated configuration. For example, the resistance device 150, 250, 450, 550, 650 may remain in the deactivated configuration until a signal is sent from the electronic controller 160 to change from the deactivated configuration into the activated configuration. In other embodiments, the electronic controller 160 may send a signal to command the resistance device 150, 250, 450, 550, 650 to remain in the deactivated configuration, and to command the resistance device 150, 250, 450, 550, 650 to change to the activated configuration, the electronic controller 160 may cease to send a signal to the resistance device 150, 250, 450, 550, 650. Alternatively, the electronic controller 160 may send signals to command the resistance device 150, 250, 450, 550, 650 to both remain in the deactivated configuration and to change to the activated configuration.

As described above and as shown in FIG. 1, when the resistance device 150 is in the activated configuration, the motor 152 may apply a force to the steering column assembly 140 to resist this rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may limit rotation of the steering wheel 142.

Similarly, as described above and as shown in FIG. 2, when the resistance device 250 is in the activated configuration, the damper 252 may apply a force to the steering column assembly 140 to resist rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may limit rotation of the steering wheel 142.

Similarly, as described above and as shown in FIG. 4, when the resistance device 450 is in the activated configuration, the resistance device 450 may restrict translation of the rack 132 in the vehicle lateral direction. By restricting translation of the rack 132 in the vehicle lateral direction, the resistance device 450 limits rotation of the front wheel 124 with respect to the body 110 of the vehicle 100. Further, by restricting translation of the rack 132, the resistance device 450 limits rotation of the steering wheel 142.

As described above and as shown in FIG. 5, when the resistance device 550 is in the activated configuration, the resistance device 550 may restrict translation of the rack 132 in the vehicle lateral direction. By restricting translation of the rack 132 in the vehicle lateral direction, the resistance device 550 limits rotation of the front wheel 124 with respect to the body 110 of the vehicle 100. Further, by restricting translation of the rack 132, the resistance device 550 limits rotation of the steering wheel 142.

Similarly, as described above and as shown in FIG. 6, when the resistance device 650 is in the activated configuration, the resistance device 650 may restrict translation of the rack 132 in the vehicle lateral direction. By restricting translation of the rack 132 in the vehicle lateral direction, the resistance device 650 limits rotation of the front wheel 124 with respect to the body 110 of the vehicle 100. Further, by restricting translation of the rack 132, the resistance device 650 limits rotation of the steering wheel 142.

Accordingly, when the electronic controller 160 commands the resistance device 150, 250, 450, 550, 650 to change to the activated configuration, the resistance device 150, 250, 450, 550, 650 may limit rotation of the front wheel 124 about the axis 200 with respect to the body 110 of the vehicle 100 and may limit rotation of the steering wheel 142. By changing the resistance device 150, 250, 450, 550, 650 to the activated configuration based on the detected rotational speed of the steering column assembly 140, the resistance device 150, 250, 450, 550, 650 may be changed to the activated configuration during a small front bumper overlap impact. As described hereinabove, during a small front bumper overlap impact, energy associated with the impact may cause the front wheel 124 to rotate with respect to the body 110 of the vehicle. Because the steering column assembly 140 is coupled to the front wheel 124 through the steering rack assembly 130 and the tie rod 128, when the front wheel 124 rotates, the steering column assembly 140 may rotate. During a small front bumper overlap impact, the rotation of the front wheel 124 may cause the steering column assembly 140 and/or steering wheel 142 to rotate at a relatively high rotational speed. In embodiments, the predetermined rotational speed may be selected such that a detected rotational speed of the steering column assembly 140 that exceeds the predetermined rotational speed may indicate that the vehicle 100 has impacted a barrier with a small front bumper overlap. For example, in one embodiment, the predetermined rotational speed may be selected to be about 300 rotations per minute (RPM). In another embodiment, the predetermined rotational speed may be selected to be about 350 RPM. In yet another embodiment, the predetermined rotational speed may be selected to be greater than about 300 RPM and less than about 1000 RPM, inclusive of the endpoints.

By limiting rotation of the front wheel 124 during a small front bumper overlap impact, the resistance device 150, 250, 450, 550, 650 may assist in maintaining the front wheel 124 near its original longitudinal orientation, as shown in FIG. 1. As described above, by maintaining the front wheel 124 near a longitudinal orientation during a small front bumper overlap impact, less energy associated with the impact may be transferred to the cabin 108 as compared to when the front wheel 124 is permitted to rotate.

Further, by limiting rotation of the steering wheel 142 during a small front bumper overlap impact, the resistance device 150, 250, 450, 550, 650 may resist and/or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the resistance device 150, 250, 450, 550, 650 may prevent the decrease in effectiveness of the supplemental restraints that are positioned within the steering wheel 142.

Figure 9:
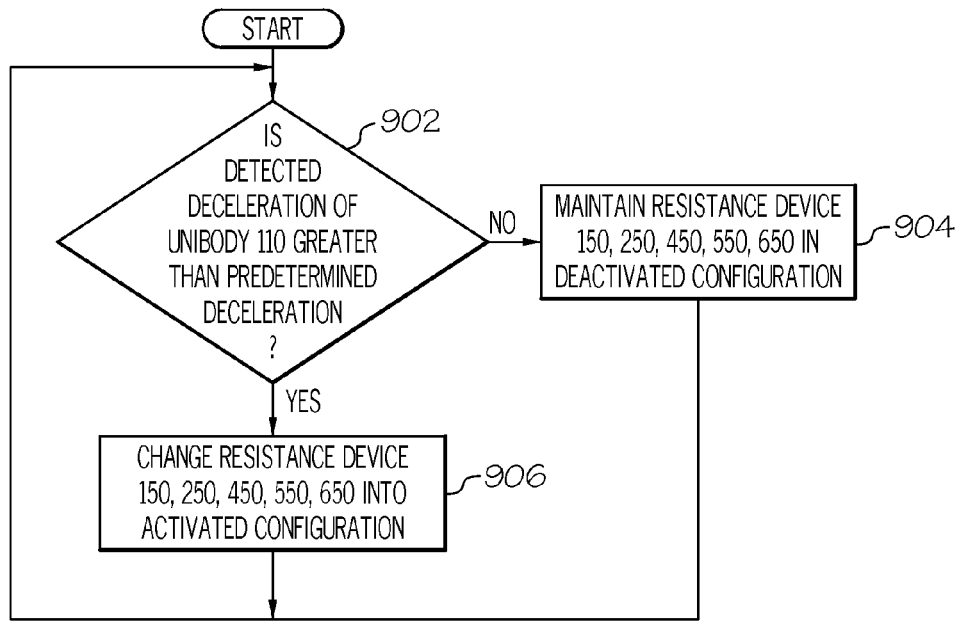
FIG. 9 schematically depicts a logic flowchart of a method of operating a vehicle system including a resistance device according to one or more embodiments shown or described herein.

Turning now to FIG. 9, another embodiment of a method for operating the steering system 120 is depicted in the flow chart of FIG. 9. The resistance device 150, 250, 450, 550, 650 is selectively placed in the deactivated configuration and the activated configuration according to the flow chart depicted in FIG. 9. In a first step 902, the electronic controller 160 receives a signal from the inertial sensor 166 indicating a deceleration of the body 110 and compares this detected deceleration to a predetermined deceleration. If the signal received by the electronic controller 160 indicates a detected deceleration that is not greater than the predetermined deceleration, then the electronic controller 160 proceeds to step 904, where the electronic controller 160 commands the resistance device 150, 250, 450, 550, 650 to remain in the deactivated configuration. If the signal received by the electronic controller 160 indicates a detected declaration that is greater than the predetermined deceleration, then the electronic controller 160 proceeds to step 906. At step 906, the electronic controller 160 commands the resistance device 150, 250, 450, 550, 650 to change from the deactivated configuration into the activated configuration.

It should be understood that the electronic controller 160 may not necessarily send a signal to command the resistance device 150, 250, 450, 550, 650 to remain in the deactivated configuration. For example, the resistance device 150, 250, 450, 550, 650 may remain in the deactivated configuration until a signal is sent from the electronic controller 160 to change from the deactivated configuration into the activated configuration. In other embodiments, the electronic controller 160 may send a signal to command the resistance device 150, 250, 450, 550, 650 to remain in the deactivated configuration, and to command the resistance device 150, 250, 450, 550, 650 to change to the activated configuration, the electronic controller 160 may cease to send a signal to the resistance device 150, 250, 450, 550, 650. Alternatively, the electronic controller 160 may send signals to command the resistance device 150, 250, 450, 550, 650 to both remain in the deactivated configuration and to change to the activated configuration.

As described above and as shown in FIG. 1, when the resistance device 150 is in the activated configuration, the motor 152 may apply a force to the steering column assembly 140 to resist this rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may limit rotation of the steering wheel 142.

Similarly, as described above and as shown in FIG. 2, when the resistance device 250 is in the activated configuration, the damper 252 may apply a force to the steering column assembly 140 to resist rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may limit rotation of the steering wheel 142.

Similarly, as described above and as shown in FIG. 4, when the resistance device 450 is in the activated configuration, the resistance device 450 may restrict translation of the rack 132 in the vehicle lateral direction. By restricting translation of the rack 132 in the vehicle lateral direction, the resistance device 450 limits rotation of the front wheel 124 with respect to the body 110 of the vehicle 100. Further, by restricting translation of the rack 132, the resistance device 450 limits rotation of the steering wheel 142.

As described above and as shown in FIG. 5, when the resistance device 550 is in the activated configuration, the resistance device 550 may restrict translation of the rack 132 in the vehicle lateral direction. By restricting translation of the rack 132 in the vehicle lateral direction, the resistance device 550 limits rotation of the front wheel 124 with respect to the body 110 of the vehicle 100. Further, by restricting translation of the rack 132, the resistance device 550 limits rotation of the steering wheel 142.

Similarly, as described above and as shown in FIG. 6, when the resistance device 650 is in the activated configuration, the resistance device 650 may restrict translation of the rack 132 in the vehicle lateral direction. By restricting translation of the rack 132 in the vehicle lateral direction, the resistance device 650 limits rotation of the front wheel 124 with respect to the body 110 of the vehicle 100. Further, by restricting translation of the rack 132, the resistance device 650 limits rotation of the steering wheel 142.

Accordingly, when the electronic controller 160 commands the resistance device 150, 250, 450, 550, 650 to change to the activated configuration, the resistance device 150, 250, 450, 550, 650 may restrict rotation of the front wheel 124 about the axis 200 with respect to the body 110 of the vehicle 100 and may restrict rotation of the steering wheel 142. By repositioning the resistance device 150, 250, 450, 550, 650 into the activated configuration based on the detected deceleration of the body 110, the resistance device 150, 250, 450, 550, 650 may be repositioned into the activated configuration during an impact, such as a small front bumper overlap impact. The predetermined deceleration may be selected such that a detected deceleration that exceeds the predetermined deceleration may indicate that the vehicle 100 has impacted a barrier. The predetermined deceleration may be selected to include deceleration values that may indicate an impact to the vehicle 100, as commonly understood in the art.

By limiting rotation of the front wheel 124 during an impact, such as a small front bumper overlap collision, the resistance device 150, 250, 450, 550, 650 may assist in maintaining the front wheel 124 near a longitudinal orientation, as shown in FIG. 1. As described above, by maintaining the front wheel 124 near its original longitudinal orientation during a small front bumper overlap impact, less energy associated with the impact may be transferred to the cabin 108 as compared to when the front wheel 124 is permitted to rotate.

Further, by limiting rotation of the steering wheel 142 during an impact, such as a small front bumper overlap impact, the resistance device 150, 250, 450, 550, 650 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the resistance device 150, 250, 450, 550, 650 may prevent the decrease in effectiveness of the supplemental restraints that are positioned within the steering wheel 142.

Figure 10:
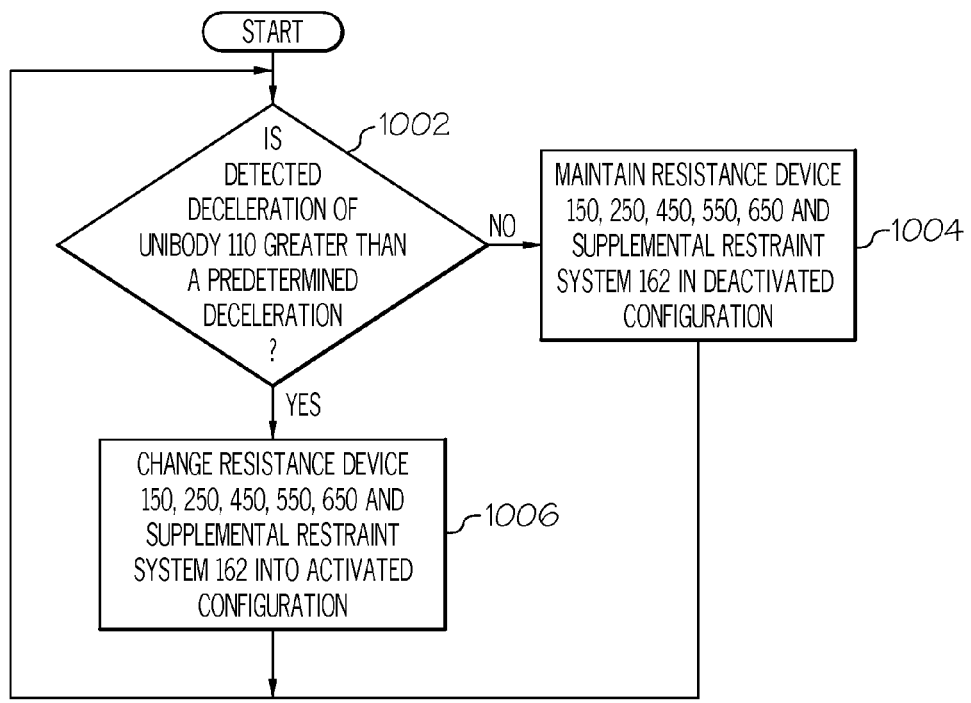
FIG. 10 schematically depicts a logic flowchart of a method of operating a vehicle system including a resistance device and a supplemental restraint system according to one or more embodiments shown or described herein.

Turning now to FIG. 10, another embodiment of a method for operating the steering system 120 is depicted in the flow chart of FIG. 10. The resistance device 150, 250, 450, 550, 650 and the supplemental restraint system 162 are selectively placed in the deactivated configuration and the activated configuration according to the flow chart depicted in FIG. 10. In a first step 1002, the electronic controller 160 receives a signal from the inertial sensor 166 indicating a deceleration of the body 110 and compares this detected deceleration to a predetermined deceleration. If the signal received by the electronic controller 160 indicates a detected deceleration that is not greater than the predetermined deceleration, then the electronic controller 160 proceeds to step 1004, where the electronic controller 160 commands the resistance device 150, 250, 450, 550, 650 and the supplemental restraint system 162 to remain in their deactivated configurations. If the signal received by the electronic controller 160 indicates a detected declaration that is greater than the predetermined deceleration, then the electronic controller 160 proceeds to step 1006. At step 1006, the electronic controller 160 commands the resistance device 150, 250, 450, 550, 650 and the supplemental restraint system 162 to change from the deactivated configuration into the activated configuration.

It should be understood that the electronic controller 160 may not necessarily send a signal to command the resistance device 150, 250, 450, 550, 650 to remain in the deactivated configuration. For example, the resistance device 150, 250, 450, 550, 650 may remain in the deactivated configuration until a signal is sent from the electronic controller 160 to change from the deactivated configuration into the activated configuration. In other embodiments, the electronic controller 160 may send a signal to command the resistance device 150, 250, 450, 550, 650 to remain in the deactivated configuration, and to command the resistance device 150, 250, 450, 550, 650 to change to the activated configuration, the electronic controller 160 may cease to send a signal to the resistance device 150, 250, 450, 550, 650. Alternatively, the electronic controller 160 may send signals to command the resistance device 150, 250, 450, 550, 650 to both remain in the deactivated configuration and to change to the activated configuration.

In the embodiment of the method for operating the steering system depicted in the flow chart of FIG. 10, the step of commanding the resistance device 150, 250, 450, 550, 650 to change into the activated configuration (i.e., step 1006) is performed simultaneously as the step of commanding the supplemental restraint system 162 (i.e., step 1006). However, it should be understand that these steps may be performed in any order (i.e., the resistance device 150, 250, 450, 550, 650 may be changed into the activated configuration before or after the supplemental restraint system 162 is repositioned into the activated configuration).

As described above and as shown in FIG. 1, when the resistance device 150 is in the activated configuration, the motor 152 may apply a force to the steering column assembly 140 to resist this rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may resist and/or restrict rotation of the steering wheel 142.

Similarly, as described above and as shown in FIG. 2, when the resistance device 250 is in the activated configuration, the damper 252 may apply a force to the steering column assembly 140 to resist rotation of the steering column assembly 140. By applying a force to the steering column assembly 140 to resist rotation of the steering column assembly 140, the resistance device 150 may limit rotation of the front wheel 124 with respect to the body 110. Further, by resisting rotation of the steering column assembly 140, the resistance device 150 may limit rotation of the steering wheel 142.

Similarly, as described above and as shown in FIG. 4, when the resistance device 450 is in the activated configuration, the resistance device 450 may restrict translation of the rack 132 in the vehicle lateral direction. By restricting translation of the rack 132 in the vehicle lateral direction, the resistance device 450 limits rotation of the front wheel 124 with respect to the body 110 of the vehicle 100. Further, by restricting translation of the rack 132, the resistance device 450 limits rotation of the steering wheel 142.

As described above and as shown in FIG. 5, when the resistance device 550 is in the activated configuration, the resistance device 550 may restrict translation of the rack 132 in the vehicle lateral direction. By restricting translation of the rack 132 in the vehicle lateral direction, the resistance device 550 limits rotation of the front wheel 124 with respect to the body 110 of the vehicle 100. Further, by restricting translation of the rack 132, the resistance device 550 limits rotation of the steering wheel 142.

Similarly, as described above and as shown in FIG. 6, when the resistance device 650 is in the activated configuration, the resistance device 650 may restrict translation of the rack 132 in the vehicle lateral direction. By restricting translation of the rack 132 in the vehicle lateral direction, the resistance device 650 limits rotation of the front wheel 124 with respect to the body 110 of the vehicle 100. Further, by restricting translation of the rack 132, the resistance device 650 limits rotation of the steering wheel 142.

Accordingly, when the electronic controller 160 commands the resistance device 150, 250, 450, 550, 650 to change into the activated configuration, the resistance device 150, 250, 450, 550, 650 may limit rotation of the front wheel 124 about the axis 200 with respect to the body 110 of the vehicle 100 and may limit rotation of the steering wheel 142. By repositioning the resistance device 150, 250, 450, 550, 650 into the activated configuration based on the detected deceleration of the body 110, the resistance device 150, 250, 450, 550, 650 may be repositioned into the activated configuration during an impact, such as a small front bumper overlap impact. The predetermined deceleration may be selected such that a detected deceleration that exceeds the predetermined deceleration may indicate that the vehicle 100 has impacted a barrier. The predetermined deceleration may be selected to include deceleration values that may indicate an impact to the vehicle 100, as commonly understood in the art.

By restricting rotation of the front wheel 124 during an impact, such as a small front bumper overlap collision, the resistance device 150, 250, 450, 550, 650 may assist in maintaining the front wheel 124 near its original longitudinal orientation, as shown in FIG. 1. As described above, by maintaining the front wheel 124 near a longitudinal orientation during a small front bumper overlap impact, less energy associated with the impact may be transferred to the cabin 108 as compared to when the front wheel 124 is permitted to rotate.

Further, by restricting rotation of the steering wheel 142 during an impact, such as a small front bumper overlap impact, the resistance device 150, 250, 450, 550, 650 may prevent or restrict rotation of the steering wheel 142. As described above, when the steering wheel 142 rotates at a relatively high rotational speed, the effectiveness of supplemental restraints that are positioned within the steering wheel 142 may decrease. Accordingly, by preventing or restricting rotation of the steering wheel 142 during a small front bumper overlap impact, the resistance device 150, 250, 450, 550, 650 may prevent the decrease in effectiveness of the supplemental restraints that are positioned within the steering wheel 142.

It should now be understood that vehicles and vehicle systems according to the present specification include a resistance device. In some embodiments, the resistance device may include a damper that is coupled to at least one of a steering rack assembly and a steering column assembly. In other embodiments, the resistance device may be repositionable between a deactivated configuration and an activated configuration, where the resistance device applies a force to resist at least one of a rotation of a steering column assembly and a translation of a steering rack assembly in the activated configuration. In some embodiments, the resistance device is repositioned into the activated configuration based on a detected deceleration of a body of the vehicle. In other embodiments, the resistance device is repositioned into the activated configuration based on a detected rotational speed of at least one of a steering column assembly and a steering wheel. By applying a force to resist rotation of steering column assembly and/or translation of a steering rack assembly, the resistance device may limit rotation of the front wheel and the steering wheel, for example, during a small front bumper overlap impact. By limiting rotation of the front wheel during a small front bumper overlap impact, the resistance device may reduce the amount of energy transferred to the cabin of the vehicle during the impact. Further, by limiting rotation of the steering wheel during an impact, the resistance device may prevent a decrease in effectiveness of the supplemental restraints that are positioned within the steering wheel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a front wheel;
   a steering column assembly coupled to the front wheel, the steering column assembly comprising a steering wheel, a steering column coupled to the steering wheel and a pinion coupled to the steering column;
   a steering rack assembly that comprises a rack coupled to the front wheel, wherein the rack extends in a vehicle lateral direction and is translatable with respect to a body of the vehicle in the vehicle lateral direction, the pinion coupled to the rack at a first location; and
   a resistance device comprising a rotary damper coupled to the steering rack assembly that limits a rotation of the steering column assembly based on a translation speed of the steering rack assembly by resisting translation of the steering rack assembly in the vehicle lateral direction, the rotary damper directly engaged with the rack at a second location that is offset from the first location to resist translation of the steering rack assembly independently of the pinion.

2. The vehicle of claim 1, wherein the resistance device comprises a passive damper that is coupled to the steering rack assembly.

3. The vehicle of claim 2, wherein the resistance device is coupled to the steering rack assembly and the passive damper provides a first resistance to a translation of the rack when the rack translates at a first translation speed, and the passive damper provides second resistance to the translation of the rack when the rack translates at a second translation speed, wherein the first resistance is greater than the second resistance and the first translation speed is greater than the second translation speed.

4. The vehicle of claim 1, wherein the resistance device comprises an active damper that is coupled to the steering rack assembly.

5. The vehicle of claim 4, wherein the resistance device is coupled to the steering rack assembly and the active damper comprises an activated configuration that provides a first resistance a translation of the rack and a deactivated configuration that provides a second resistance to the translation of the steering rack assembly, wherein the first resistance is greater than the second resistance.

6. A vehicle system comprising:
   a front wheel;
   a steering column assembly coupled to the front wheel, the steering column assembly comprising a steering wheel and a pinion coupled to a steering column;
   a steering rack assembly that comprises a rack coupled to the front wheel, wherein the rack extends in a vehicle lateral direction and is translatable with respect to a body of the vehicle in the vehicle lateral direction, the pinion coupled to the rack at a first location;
   a sensor configured to provide an output based on a vehicle condition;
   a resistance device comprising a rotary damper coupled to the steering rack assembly, the rotary damper directly engaged with the rack at a second location that is offset from the first location to resist translation of the steering rack assembly independently of the pinion, wherein the resistance device comprises a deactivated configuration and an activated configuration; and
   an electronic controller that is communicatively coupled to the resistance device and the sensor, the electronic controller comprising a processor and a memory storing a computer readable and executable instruction set, wherein, when the computer readable and executable instruction set is executed by the processor, the electronic controller:
      detects the vehicle condition with the sensor; and
      commands the resistance device to change from the deactivated configuration into the activated configuration based on the detected vehicle condition, wherein the rotary damper applies a force to resist translation of the rack of the steering rack assembly in the activated configuration.

7. The vehicle system of claim 6, wherein the sensor comprises an inertial sensor coupled to the body of the vehicle, wherein the inertial sensor is configured to provide the output that is indicative of a deceleration of the body, and wherein when the computer readable and executable instruction set is executed by the processor, the electronic controller detects the deceleration of the body with the inertial sensor and commands the resistance device to change from the deactivated configuration into the activated configuration based on the detected deceleration.

8. The vehicle system of claim 7, further comprising a supplemental restraint system that is communicatively coupled to the electronic controller, the supplemental restraint system comprising a deactivated configuration and an activated configuration, wherein when the computer readable and executable instruction set is executed by the processor, the electronic controller further commands the supplemental restraint system to reposition from the deactivated configuration into the activated configuration based on the detected deceleration of the body.

9. The vehicle system of claim 6, wherein the sensor comprises a rotational sensor coupled to at least one of the steering column assembly and the steering wheel, wherein the rotational sensor is configured to provide the output that is indicative of a rotational speed of at least one of the steering column assembly and the steering wheel, and wherein when the computer readable and executable instruction set is executed by the processor, the electronic controller detects the rotational speed of at least one of the steering column assembly and the steering wheel with the rotational sensor and commands the resistance device to change from the deactivated configuration into the activated configuration based on the detected rotational speed.

10. The vehicle system of claim 9, wherein the rotational sensor is coupled to the steering column assembly.

11. The vehicle system of claim 9, wherein the rotational sensor is coupled to the steering wheel.

* * * * *